Mar. 13, 1923.
J. J. McDERMITT
1,448,692
FITTING UP BOLT
Filed Mar. 24, 1922
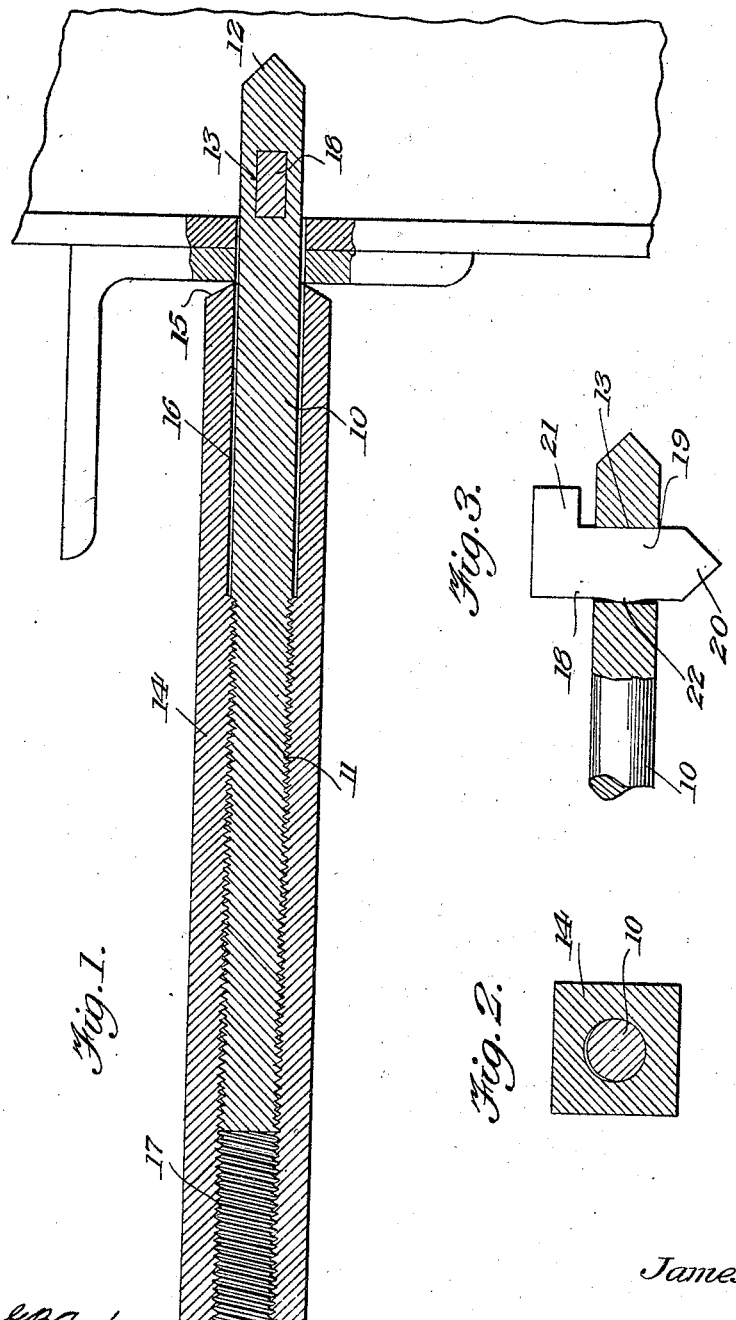
James J. McDermitt
INVENTOR
BY Victor J. Evans
ATTORNEY Patented Mar. 13, 1923.

1,448,692

UNITED STATES PATENT OFFICE.

JAMES J. McDERMITT, OF RENOVO, PENNSYLVANIA.

FITTING-UP BOLT.

Application filed March 24, 1922. Serial No. 546,364.

*To all whom it may concern:*

Be it known that I, JAMES J. MCDERMITT, a citizen of the United States, residing at Renovo, in the county of Clinton and State of Pennsylvania, have invented new and useful Improvements in Fitting-Up Bolts, of which the following is a specification.

This invention relates to securing devices, particularly to bolts, and has for its object the provision of a novel bolt designed for use in fitting up structural elements, that is drawing together joints between brackets, sheets of material, beams and in fact all types of structural elements where ordinary bolts are commonly used for drawing the parts together.

An important object and a more specific one is the provision of setting-up bolt of this character and for this purpose which includes an elongated shank threaded throughout a part of its length and having one end provided with a removable abutment head, the bolt furthermore including a socket member which is associated with the shank and which is threaded throughout a portion of its length, one of the advantages being that the threads are always protected and prevented from being battered in any way while the device is being used for the purpose mentioned.

An additional object is the provision of a device of this character which will be very simple and inexpensive in manufacture, highly efficient in use, and labor saving in use and a general improvement in the art.

With the above and other objects and advantages in view, the invention consists in the details of construction to be hereinafter more fully described and claimed and illustrated in the accompanying drawings in which, Figure 1 is a longitudinal sectional view through my device and showing it in association with structural elements.

Figure 2 is a cross-sectional view and

Figure 3 is a detail section showing the abutment pin.

Referring more particularly to the drawings I have shown my device as comprising an elongated shank 10 which is cylindrical in shape and which is threaded as indicated at 11 throughout substantially one half of its length and which has its other half left smooth or unthreaded and terminating in a conical point 12. Near the point 12 the shank 10 is formed with a transverse slot 13 for a purpose to be described.

My device further includes an elongated socket member 14 which is angular in cross-section and which has its cross-sectional dimensions corresponding to the dimensions of a nut which would be used in conjunction with a bolt corresponding to the size of the shank 10. The ends of the socket member 14 are beveled as indicated at 15 and this socket member is formed with a bore 16 which is smooth and which extends substantially through one half of its length and with a threaded bore 17 which extends throughout the remainder of the length.

In conjunction with the two above described elements I make use of an abutment pin designated by the numeral 18 which includes an elongated shank 19 having a tapered end 20 and having an L-shaped head 21. Near the head this abutment pin is formed with a slight hump 22. This pin is designed for insertion through the slot 13 and the purpose of the hump is to cause sufficient frictional engagement to prevent the pin from dropping out casually.

In the use of the device the shank 10 is inserted into the socket 14 and is turned up slightly so as to engage a few of the threads on the shank with the threaded portion 17 of the bore of the socket member whereupon it will be seen that all the threads on the shank will be entirely enclosed and will be protected from injury. The shank 10 has its smooth end inserted through the holes in the structural elements to be fitted up or drawn together, the conical end 12 facilitating this action. The locking pin 18 is then placed through the slot 13 and will be held firmly therein owing to the provision of the hump 22. The operator then grasps the socket 14 with any suitable wrench and turns it down so as to bring the beveled end 15 into engagement with the adjacent structural element whereupon the screwing action is continued until the structural elements are drawn together. In order to effect removal it is merely necessary to unscrew the socket member 14 slightly to release the tension upon the structural element whereupon the pin 18 may be readily driven out and the shank 10 then removed together with the socket from the work.

From the foregoing description and a study of the drawings it will be apparent that I have thus provided a very simply constructed bolt for fitting up or drawing together structural elements, which will be a great time and labor saver inasmuch as it entirely avoids the battering of the threads which occurs in the use of the ordinary bolt, the threads of the present device being at all times entirely enclosed and not only protected from battering but also protected from dirt and corrosion. Another advantage is that there is no time lost in assembling the parts such as is lost in attempting to thread a nut onto a battered thread. Still another advantage is the fact that the present device entirely obviates the necessity for the employment of washers which are used in connection with ordinary bolts and this is a great saving in the cost of the material. It is believed that the above description and explanation of the advantages will be so apparent that one skilled in the art that further detailed disclosure is believed to be unnecessary.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim;

A device of the character described comprising an elongated cylindrical shank having one end terminating in a conical point and having said end provided with a slot slightly spaced from said point, said shank being threaded throughout substantially one half of its length, a locking pin disposable transversely through said slot and provided with a hump constituting retaining means for preventing casual dislodgment, and a tubular shank of elongated formation adapted for association with said first named shank and having substantially one half of its bore unthreaded and interengaging with the threads on the shank member.

In testimony whereof I affix my signature.

JAMES J. McDERMITT.